Sept. 8, 1936.     H. A. GERLAND     2,053,608
PRETZEL MAKING MACHINE
Filed May 15, 1935     5 Sheets-Sheet 1

Inventor
Harry A. Gerland
by Wilkinson &
Mawhinney
Attorneys.

Sept. 8, 1936. H. A. GERLAND 2,053,608
PRETZEL MAKING MACHINE
Filed May 15, 1935 5 Sheets-Sheet 3

Inventor
Harry A. Gerland
By Wilkinson & Mawhinney
Attorneys.

Patented Sept. 8, 1936

2,053,608

UNITED STATES PATENT OFFICE 2,053,608

PRETZEL MAKING MACHINE

Harry A. Gerland, Baltimore, Md.

Application May 15, 1935, Serial No. 21,626

8 Claims. (Cl. 107—8)

The present invention relates to an improved machine for automatically making pretzels to the point where they are ready to be baked, the object of the invention being to provide a relatively simple machine for operating upon a measured quantity of dough for rolling the same into a strip and then carrying the strip through the various portions of the machine for looping it, twisting it, folding it and pressing the same to final shape; and carrying the formed pretzels in a conveyor or the like for delivery to the oven so that the pretzels may be fed into the end or the side of an oven.

Another object of this invention is to provide a novel construction of dough rolling means for producing rolled strips of dough which are uniform in size and which is adjustable so that the dough strips may be made of desired thickness within a practical range.

Another object of the invention is to provide the machine with a novel construction of timing chute or device for insuring the delivery of the rolled dough strips at the proper intervals so that the same may be looped with a series of operating steps so as to speed up the operation of the complete machine, and to provide ample intervals of time between the looping of the strips to prevent the breaking or tearing of the strips such as would occur were the operation single and accelerated.

Further objects of the invention are to improve certain detailed portions of the machine for carrying out the general objects of rapidity in the manufacture of the pretzels without injury to the dough strips at any step in the formation thereof.

With the foregoing and other objects in view, the invention will be more fully described hereinafter, and will be more particularly pointed out in the claims appended hereto.

In the drawings, wherein like symbols refer to like or corresponding parts throughout the several views.

Referring now to the drawings, the pretzel machine may be provided with a frame 30 of any suitable construction to adapt it for carrying the various parts required in the formation of the pretzel and the frame is preferably portable as by the provision of wheels or rollers 31 of any suitable construction and number. The frame 30 is preferably vertically disposed so that the consecutive operations of the machine are carried on as the dough strip moves downwardly through the frame and thus the operations are assisted by gravity.

At the top of the frame 30 is disposed a hopper 32 adapted to receive dough to be made into pretzels, and the hopper 32 opens at its lower end into a feed cylinder 33 in which is disposed a suitable feed screw 34 mounted on the shaft 35 extending lengthwise in the cylinder 33 and which is driven through gears 36 from any suitable source of power for turning the feed screw 34 at the desired rate of speed to advance the dough in the desired proportion from the lower end of the cylinder 33. The lower end of the cylinder 33 is partially closed by a head 37 having an aperture 38 suitably shaped and proportioned to admit the ejection of a bog or lump of dough of the desired size and proportion, and these lumps of dough are cut off in desired lengths by a cutter 39 mounted on the shaft 35 and rotatable with the conveyor 34 for severing the ejected dough at each revolution of the shaft. Of course the cutting off of the dough may be accomplished otherwise than as shown so as to provide a quantity of dough which is sufficient for the purpose.

Also mounted in the upper part of the frame 30 is a strip rolling mechanism which comprises a concave 40 having its forward end terminating adjacent the cylinder 33 and provided with a stripping plate 41 adapted to receive thereover the length of dough as it is ejected and cut off from the front end of the cylinder 33.

Figures 11, 13:
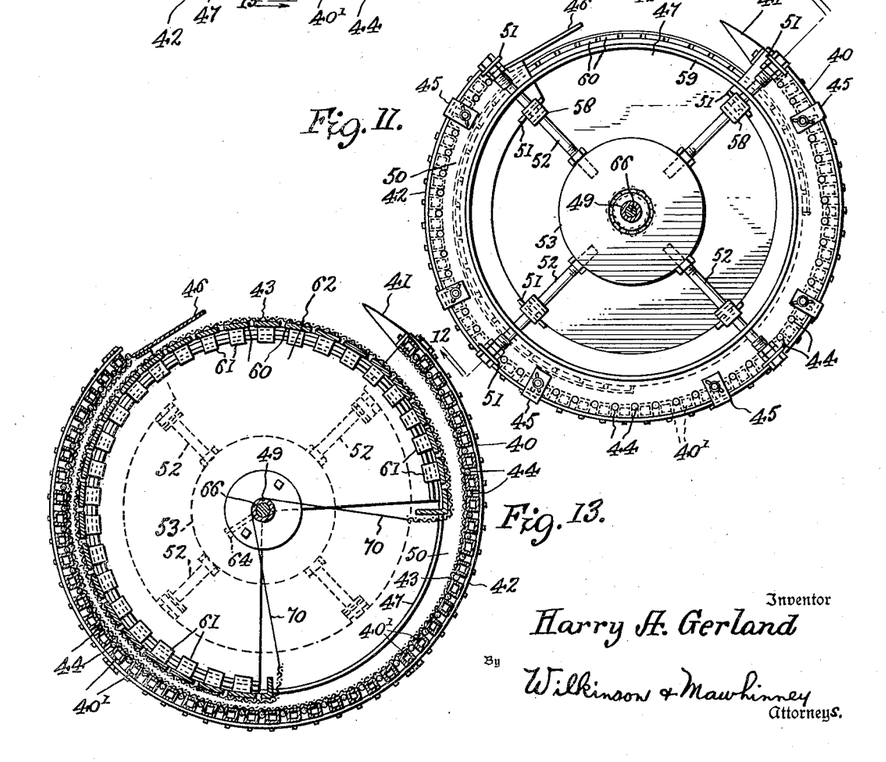
Figure 11 is a detail end elevation of the dough strip rolling device.
Figure 13 is a transverse section through the strip rolling device taken on the line 13—13 of Figure 12.
Figure 12:
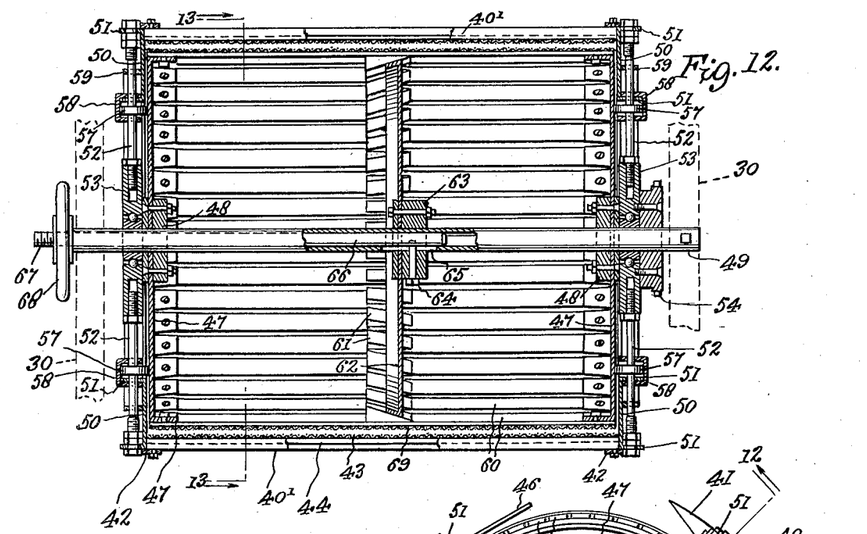
Figure 12 is a longitudinal section taken through the same substantially on the line 12—12 of Figure 11.
Figure 14:
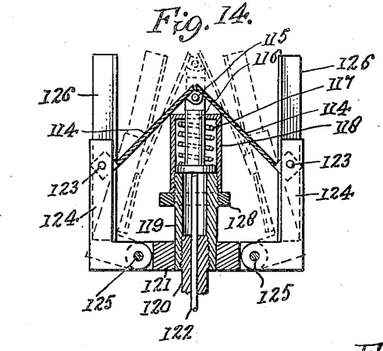
Figure 14 is a detail enlarged sectional view taken through the twister.

The concave 40 may be constructed, as shown in detail in Figures 11, 12 and 13, of a plurality of longitudinal tubes secured in spaced apart relation by curved bands 42 to which the tubes may be riveted so as to hold the tubes into substantially flat form. The concave 40 may extend substantially three-fourths of the circumferential length of the strip rolling mechanism and the inner surface of the concave is preferably covered by a layer of fabric 43. This fabric sheet or strip 43 is spread over a plurality of rods 44 which form the supporting frame for the concave, and the hollow tubes 40', which are preferably rectangular in cross section, are forced radially inward between the rods 44 and against the fabric sheet 43 to loop the sheet inwardly about the rods and thus provide a suitable inner surface for the concave. This outer removable portion of the concave, comprising the tubes 40' and the bands 42, are assembled in any desired numbers so that the tube structure may be in sections to facilitate its easy removal and replacement and, as shown in Figure 11, clips 45 may be employed for the different sections to hold the same to the end portions of the concave. The stripping plate 41 is at the forward end of the concave, while at the rear end of the concave is disposed a pivoted delivery apron 46 which is adapted to receive thereover the rolled strip for delivery into the timing chute of the machine.

Within the concave 40 is disposed a stationary cylinder 47 having opposite end head discs provided with hub portions 48 fixed upon a hollow shaft 49 which extends entirely through the cylinder and which is fixed in suitable manner to the opposite sides of the frame 30. At the opposite ends of the concave are disposed annular rims 50 which may be made in any number of sections and which have in radial alinement lugs 51 at their outer and inner edges through which engage radially disposed rods 52 having threaded nuts thereon for engaging the lugs 51 to hold the rims 50 at desired radial distances from the axis of the cylinder and to thus regulate the size of the space between the fixed cylinder 47 and the outer concave 40.

The inner ends of the rods 52 are adjustably secured to hub rings 53 which are suitably mounted, by ball bearings or the like, on the outer end portions of the hollow shaft 49. Any suitable means may be provided for turning the concave 40 and in Figure 12 a sprocket wheel 54 is mounted on one of the hub rings 53 and is adapted to be turned by a sprocket chain 56 or the like which is part of the mechanism and which may be connected to the gearing 36 for properly timing the feed screw 34 with the rotation of the concave 40.

The radial rods 52 are preferably provided with ball bearing rollers 57 mounted in clips 58 attached to the inner lugs 51 for holding the rollers 57 in proper position upon the rods 52 and against the adjacent end discs or heads 47 of the stationary cylinder. Annular bands or rings 59 are mounted upon the radial rods 52 between the lugs 51 so as to interbrace the rods and distribute the strain imposed thereon uniformly throughout the structure of the concave. The inner threaded ends of the rods 52 are preferably reduced in diameter so that the rods may be quickly and easily assembled throughout the openings in the lugs 51, bands 59 and the like and so that the threaded ends of the rods may be quickly turned into engagement with the hub rings 53. This facilitates assemblage and separation of the parts. The stationary cylinder or drum 47 is provided with a plurality of spaced longitudinal strips 60 which are suitably fastened to the end or head discs of the drum and which may be sprung outwardly by wedges 61 carried upon the inner sides of the strips 60 intermediate their ends and which have inwardly fixed cam surfaces receiving thereagainst the correspondingly shaped peripheral edge of a disc 62. The disc 62 is adapted for longitudinal axial movement in the drum and is provided with a hub 63 which is slidable on the fixed hollow shaft 49 and which is provided with a key or set screw 64 which projects through a longitudinal slot 65 in one side of the hollow shaft 49 and engages with a shifting rod 66 which extends through the hollow shaft 49 and beyond one end thereof. The outer end of the rod 66 is threaded at 67 to receive a hand wheel 68 adapted to turn on the threaded portion 67 and which bears against the hollow shaft 49 so as to shift the rod 66 longitudinally, shift the disc 62 and more or less project the wedges 61 radially outward to expand the cylinder through the slats 60. This stationary cylinder 47 is also provided with a surface layer of fabric 69. The sheet of fabric 69 is placed over the slats 60 and the ends of the fabric are drawn taut about the opposite ends of the peripheral surface of the cylinder, as shown in Figure 13, and held taut by flexible connectors 70 or the like which may engage the shaft 49 as shown.

Figures 2, 10:
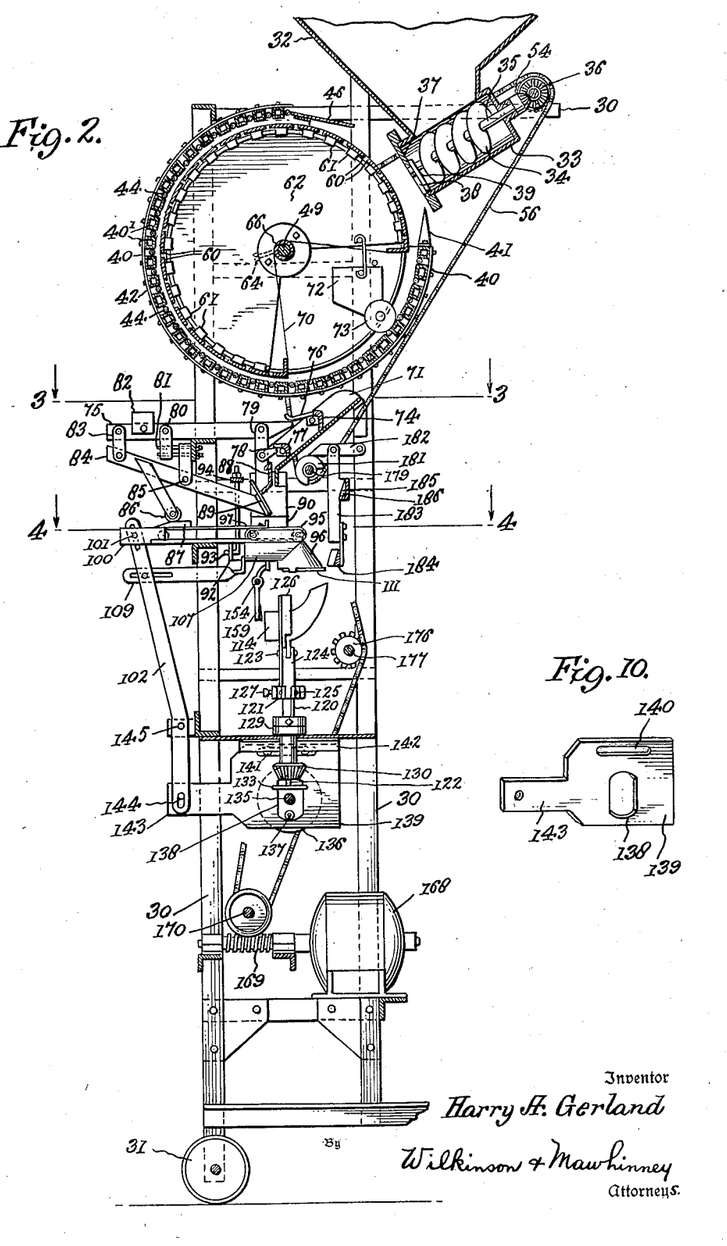
Figure 2 is a vertical transverse section taken through the same substantially on the line 2—2 of Figure 1.
Figure 10 is a detail perspective view of the vibratory plate for actuating the timing mechanism and the looping conveyor.

The inner cylinder 47 remains stationary while the outer concave makes a complete revolution from the position shown in Figure 2 back into such position, and during such time the portion of dough delivered from the cylinder 33 has been rolled between the two layers of fabric and the cylinders have been so adjusted as to produce a rolled dough strip of the desired thickness and length.

As the free or rear end of the concave 40 passes beneath the bottom of the stationary cylinder 47 the apron 46 swings downwardly and wipes across the upper end of a delivery chute 71 but also forms a timing chute so that the formed dough strip may roll downwardly over the apron 46 into the chute 71. Each time the wiping plate 41 reaches the position shown in Figure 2, a new quantity of dough has been ejected from the cylinder 33 and cut off from the main supply so that the plate 41 may pick up the new lump or gob of dough and start the rolling operation. For the purpose of preventing the dough being rolled from sticking to the cylinder, a flour bin 72 may be suspended within the stationary cylinder 47 and provided with a suitably constructed distributing wheel 73 disposed in the path of the concave 40 so as to roll against the inner side thereof and distribute sufficient flour from the bin 72 to the inner surface of the concave.

Figures 1, 9:
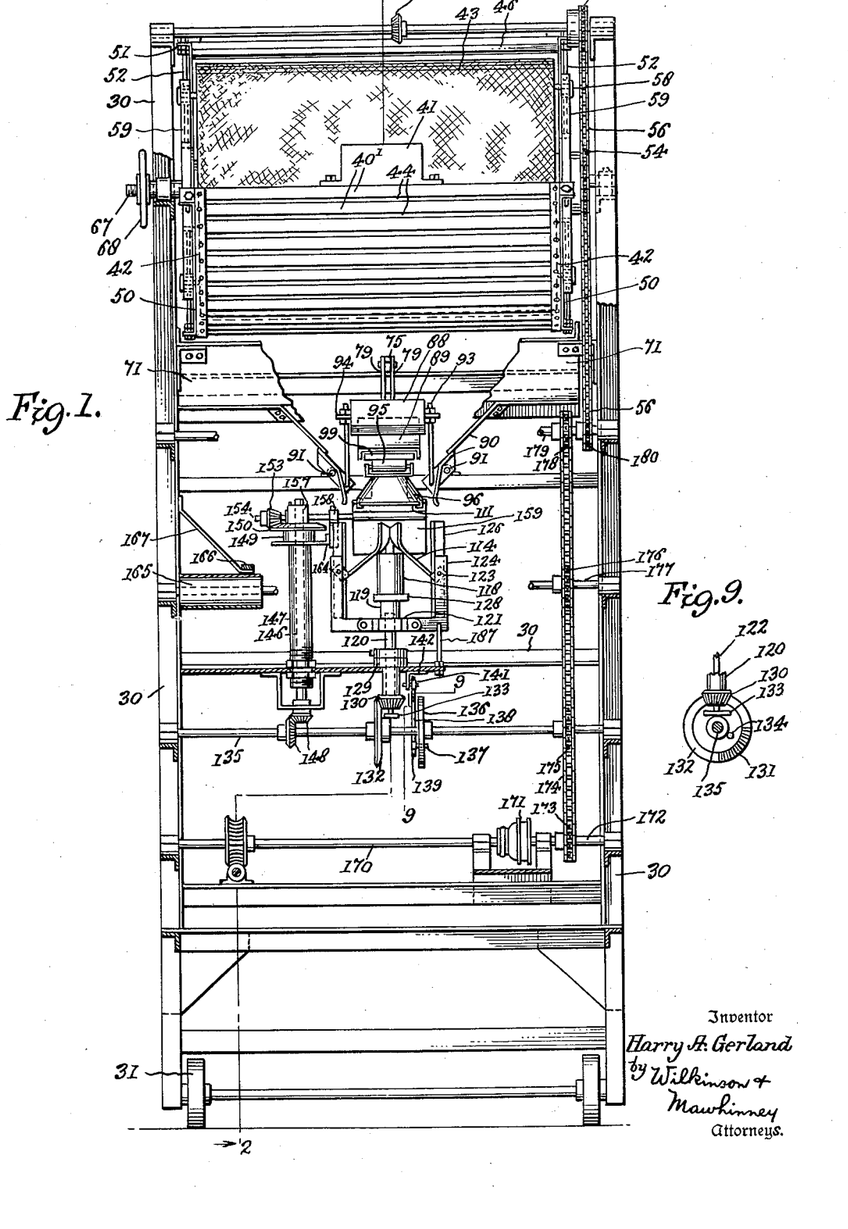
Figure 1 is a front elevation, partly in section and partly broken away of a pretzel machine embodying the features of the present invention.
Figure 9 is a detail sectional view taken on the line 9—9 of Figure 1 showing the actuating device for gripping the ends of the pretzel prior to twisting.

The chute 71 is relatively flat and broad, as shown in Figure 1, and extends substantially the full length of the concave 40 so that the rolled dough strip may fall upon the chute 71 in straight line position. The dough strip rolls downwardly over the chute 71 and against a gate or shutter 74 against which the dough strip is straightened.

The dough strip is held against this gate or shutter 74 by its own weight and the latter remains closed until the operation of the arm 75 swings the gate into open position by engaging a finger 76 projecting inwardly from the gate 74. The gate is pivotally mounted upon the sides of the chute 71 and when the finger 76 is lifted the gate 74 is swung into open position to release the strip of dough so that the latter may continue downwardly over the upper surface of the chute 71 and into contact with the second gate 77 disposed near the lower end of the chute. The latter gate 77 is relatively quick acting as it is opened by a yieldable latch 78 carried upon a bar 79 which extends downwardly from the arm 75. The latch 78 is lifted with the arm 75 and moves the gate 77 into open position for releasing the lower rolled strip of dough and as soon as the latch 78 passes the finger of the gate 77 the latter is permitted to snap closed. The return of the arm 75 and the latch 78 snaps the latter over the finger of the gate and into position for a subsequent opening movement. The arm 75 is supported on a pivot 80 carried by a bracket 81 mounted on a frame 30 and a weight 82 is adjustably disposed upon the outer portion of the arm 75 so as to normally urge the inner end of the arm upwardly.

The outer end of the arm 75 is connected by a link 83 to the outer end of the lever 84 which extends inwardly and downwardly toward the lower end of the chute. The lever 84 is pivoted at 85 intermediate its ends upon the bracket 81 and a roller 86 is mounted by a small bracket upon the outer end portion of the lever 84 and rests upon the upper surface of a rearwardly inclined wedge 87 which is shiftable beneath the roller 86 to raise and lower the rear end of the lever 84 and the arm 75 connected thereto.

Figures 16, 17, 18, 19, 20:
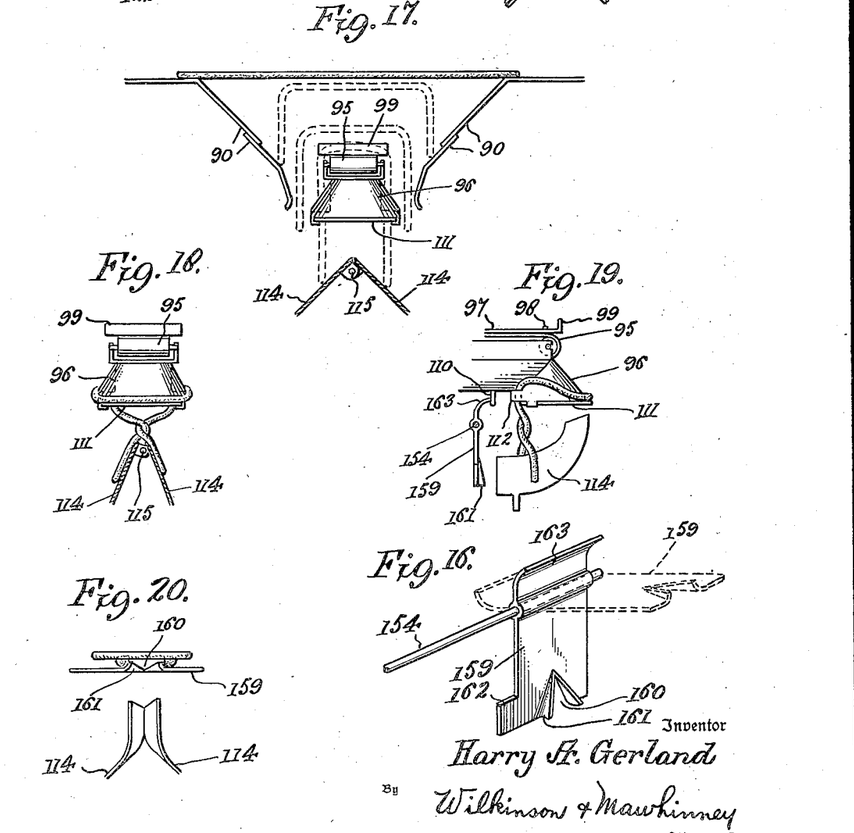
Figure 16 is a detail perspective view of the folding and discharging pallet, the dotted lines showing the folding position.
Figure 17 is a detail diagrammatic showing of the feeding of the strip into position to be twisted, the dotted lines showing the successive positions of the strip and its ends as it moves into looped position.
Figure 18 is another diagrammatic view of the loop forming device having a strip looped and twisted thereon and ready to be folded.
Figure 19 is a side elevation of the same showing the pallet about to engage the lower portion of the looped strip to fold the same.
Figure 20 is a fragmentary front elevation of the same showing the pallet raised and with the twisted strip in folded position to complete the pretzel formation.

The link 79 carries at its lower end a gate plate 88 which extends across the lower end of the feed chute 71 approximately one-fourth the width of the latter and disposed at the middle portion of the machine and adapted for vertical movement with the link 79 to release the intermediate portions of the dough strips one at a time, and the plate 88 is flanged at its lower end to provide a pusher element for the forcing the intermediate portion of the dough strip downwardly over an inclined plate 89 mounted on the lower end of the lever 84. The chute 71 is provided at its lower end with a pair of inwardly and downwardly converging guides 90 over which the free ends of the dough strip are adapted to gradually fall to prevent the too rapid swinging of the ends of the dough strip downwardly and to direct the same as shown in Figure 17 to impart a U-shape to the dough strip.

Figure 3:
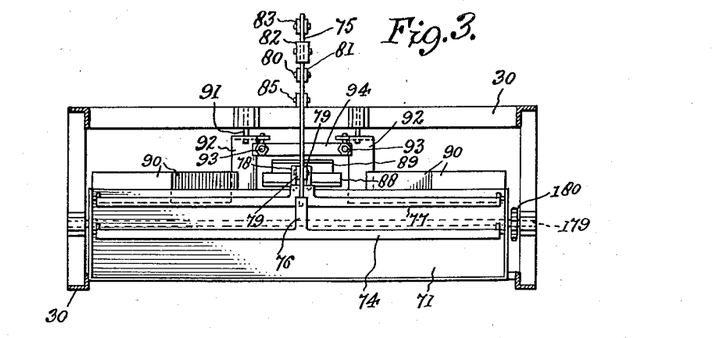
Figure 3 is a transverse section taken through the upper portion of the machine substantially on the line 3—3 of Figure 2 and showing the timing devices and the feed chute for the rolled dough strips.

As shown in Figure 3, a cross portion of the frame 30 is provided with a pair of inwardly extending supporting rods or pins 91 on the inner ends of which are pivotally mounted a pair of wings 92 which converge forwardly, as shown in Figure 1, and are adapted to receive thereagainst the free end portions of the dough strip. These wings 92 are pivotally supported by the rods 91 and are also pivotally connected at their forward ends to upwardly extending rods 93 which are connected at their upper ends to a cross bar 94 carried by the lever 84 so that as the latter swings upwardly at its forward end the rods 93 are raised and the wings 92 are swung toward each other to move the free ends of the dough strip closer together. Immediately prior to the operation of the wings 92 the middle portion of the dough strip slides down the plate 89 and drops upon a conveyor 95 which operates horizontally and is adapted to carry the dough strip forwardly over a loop forming head 96 which is disposed immediately beneath the outer end of the conveyor 95. A pusher plate 97 is disposed horizontally and projects at one end over the inner portion of the conveyor 95 and is connected to the conveyor by a pin 98 or the like, the forward end of the plate 97 having an upturned shoulder 99 adapted to engage the middle portion of the dough strip so as to move the same with the conveyor forwardly with the plate 97.

The wedge 87 is mounted on the rear end portion of the plate 97 so as to coordinate the movement of the plate 97 with the levers 84 and 75. The rear end of the plate 97 has downturned flanges 100 which carry a transverse rod 101 engaging in the slot of an actuating lever 102 which extends downwardly from the plate 97. The flanges 100 also carry rollers 103 or the like which engage a fixed plate 104 carried by the frame 30, the plate 104 also serving as a guide to maintain the plate 97 in a horizontal position. The plate 104 is also flanged to carry a pair of shafts 105 equipped with rollers for supporting the conveyor 95. The lever 102 is reciprocating so as to impart a similar movement to the conveyor or belt 95 and to thus advance the dough strips one at a time over the conveyor and to the head 96. The loop forming head 96 is given a horizontal cross sectional shape similar to that of the formation of the loop in the pretzel so that the intermediate portion of the dough strip as it falls over the forward end of the conveyor 95 will engage the head 96 and will be formed into the desired shape thereby, the head 96 tapering upwardly so as to gradually receive the loop of the dough strip and shape the same. The head 96 has a shank 106 secured along the under side of the fixed plate 104 and the shank 106 is preferably hollow with a bottom wall 107 to form a support and guide for an upwardly extending loop 108 of a lever 109 adapted to receiprocate through the shank 106.

The bottom wall 107 is provided at its forward edge with a downturned stop flange 110 while the loop 108 is of greater length than the wall 107 and has at its forward end a supporting plate 111 adapted to project beyond the lower edge of the head 96 to support the looped portion of the dough strip. The head 96 is provided with a pair of laterally disposed lugs 112 adapted to receive the side portions of the loop of dough and which holds the side portions from forward movement while the loop of the dough is rounded and shaped to the head 96. These lugs 112 hold the dough strip in place until the lever 109 with its plate 111 are retracted and moved backwardly, the offset rear end 113 of the plate 111 engaging the sides of the dough strip and disengaging them from the lugs 112. Of course the conveyor 95 and the head 96 with its adjacent parts may be interchanged with similar parts of different sizes to adapt the machine to pretzels of different sizes.

Immediately after the side wings 92 are swung up toward each other to move the free end portions of the dough strip closer together, a twister rises into engagement with the extremities of the dough strip and effects the twisting of the size of the dough strip above its extremities.

This twister, shown to advantage in Figures 1, 2, 14 and 15, comprises a pair of plates 114 which are pivotally connected together at the central axis of the machine at 115 and to the upper end of a plunger 116 which is headed at its lower end to support a spring 117 normally urging the plunger downwardly, the spring 117 being housed in the cylinder 118 mounted on the upper end of a tubular shaft section 119 which is mounted on the upper end of the tubular shaft 120 and the shaft section 119 carries a cross piece 121 adapted to turn with the shaft and shaft section as a unit for carrying out the twisting operation. A push rod 122 is mounted in the shaft 120 and bears at its upper end against the head of the plunger 116 so as at times to lift the plunger with the plates 114, the latter swinging inwardly at their lower ends toward each other. The lower ends of the plates 114 are pivotally connected at 123 to the upper ends of angle levers 124 which latter are pivoted at 125 to the outer ends of the cross piece 121. The angle levers 124 carry out gripping plates 126 which extend above the pivots 123 so that the plates 114 and 126 provide gripping or engaging surfaces adapted to engage the free extremities of the dough strip when the twister is raised and to hold the ends during the turning of the twister with its shaft 120.

Figure 15:
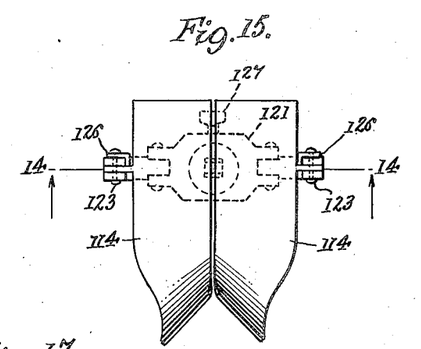
Figure 15 is a top plan view of the same.

The normal forward ends of the plates 114 are curved upwardly and are flared outwardly from their inner edges as shown in Figures 2 and 15 to maintain the extremities of the twisted strips in divergent position. The cross piece 121 may be adjusted vertically on the shaft section 119 and held in adjusted position by a thumb screw 127 or the like, as shown in Figures 2 and 15. This accommodates longer or shorter lengths of dough being operated upon. The shaft section 119 is provided with a lock nut 128 which bears against the lower end of the cylinder 118, which latter is also threaded upon the shaft section 119 so as to lock the cylinder in vertical adjusted position on the shaft section. The hollow shaft 120 extends downwardly in the frame 30 and passes through a suitable bearing 129 mounted on the frame and is provided with a bevel pinion 130 at its lower end which at times meshes with a toothed segment 131 which extends approximately 90° upon the surface of a bevel gear wheel 132 so that the shaft 120 is given one complete turn at each revolution of the bevel gear wheel 132 and also has a substantial dwell or period of rest during the turning of the bevel gear wheel.

The push rod 122 extends below the pinion 130 and has a head 133 on its lower end adapted to be raised by a pin 134 which is provided on the level gear wheel 132 at a point approximately opposite the toothed portion 131, the pin 134 adapted to lift the push rod 122 and raise the twister as above described. The gear wheel 132 is mounted on a shaft 135 which is disposed in the frame and at one side carries a disc 136 with an eccentric pin 137 at one side which operates in a cam opening 138 of a vibratory or reciprocating plate 139. The opening 138 is disposed in a general vertical direction and the pin 137 is adapted to shift the plate back and forth during the rotation of the disc 136. The upper end of the plate 139 is longitudinally slotted at 140 to receive guide rollers 141 which are carried upon a bracket 142 mounted on the frame. The plate 139 has an arm 143 which projects rearwardly from the plate, as shown to advantage in Figures 2 and 10, and the rear end of the arm 143 is connected by a pin and slot connection 144 with the lower end of the lever 102 so as to reciprocate the upper end thereof. The lever 102 is pivotally mounted at 145 upon the frame and near the lower end of the lever. The plate 139 thus serves to properly time the operation of the conveyor and the twister.

Figures 4, 5, 6:
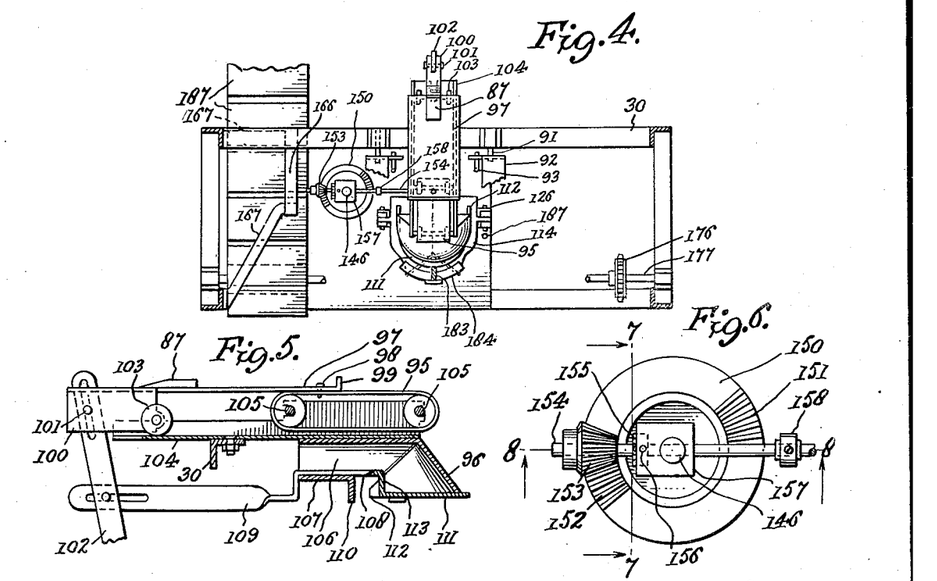
Figure 4 is a like view taken on the line 4—4 of Figure 2 and showing the looping mechanism and also the means for folding and removing the pretzel to the oven conveyor.
Figure 5 is a detail enlarged fragmentary sectional view taken through the loop forming mechanism.
Figure 6 is a detail enlarged top plan view of the intermittent gear mechanism for operating the discharge pallet of the machine.
Figure 7:
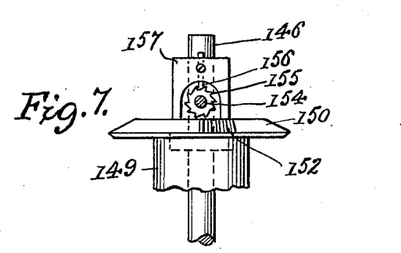
Figure 7 is a fragmentary sectional view taken through the same on the line 7—7 of Figure 6.
Figure 8:
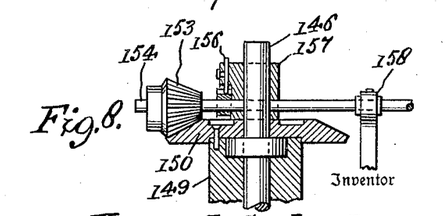
Figure 8 is a fragmentary sectional view taken through the same at right angles to the showing in Figure 7 and on the line 8—8 of Figure 6.

Means is provided for folding the pretzels into finished position immediately after the twisting operation, and for also removing the pretzels when folded to convey the same to an oven. This means comprises a vertical shaft 146 mounted in the hollow housing 147 on the frame and at its lower end is connected by bevel gears 148 to the shaft 135. The upper end of the shaft 146 is provided with a supporting head 149 disposed above the hollow housing 147, and the shaft 146 may be adjustable so as to adapt the same to various heights. The shaft 146 carries on its upper end a bevel gear 150 which, as shown in Figures 6, 7 and 8 provided with two spaced apart toothed portions 151 and 152 adapted to alternately engage a bevel pinion 153 disposed on a horizontal shaft 154. The shaft 154 extends through the upper portion of the vertical shaft 146 and normally extends inwardly of the machine and is adapted to swing about the shaft 146 as an axis at times so as to transfer folded pretzels. As soon as the twisting device is lowered, the arm or shaft 154 is swung by the shaft 146 into position beneath the forming or looping mechanism, as shown in Figure 2.

At this time the shaft 154 is held by a ratchet wheel 155 carried by the shaft and which is locked from backward movement by a pawl or dog 156 sliding vertically in a block 157 fitted about the upper end of the shaft 146. At this time a counterweight 158 fixed to the shaft 154, is disposed horizontally and urges the ratchet wheel 55 against its pawl 156. The outer or long end of the shaft 154 provides an arm on which is disposed a pallet plate 159 and this plate extends downwardly when the counterweight 158 is horizontally disposed. As shown in Figure 16, the pallet plate 159 is provided with a downwardly flaring slot 160 at its lower end adapted to slide over the upper ends of the plates 114 of the twister and the edge portions of the plate 159 at the slot 160 may be bent out to provide supporting flanges or shoulders 161 for engaging the free ends of the twisted dough strip to hold the ends in divergent relation. The lower end of the plate 159 is also provided with a laterally extending lug 162 for the purpose which will presently appear. The inner end of the pallet plate 159 is provided with a curved lip 163 adapted to engage the downturned flange 110 of the former head shank to assist in swinging the pallet upwardly into horizontal position when the shaft 154 is advanced.

The beveled gear wheel 150 is stationary on the upper end of the housing head 149 and the pinion 153 is adapted to traverse the surface of the gear wheel 150. When the pinion 153 is disengaged from the tooth portion 152 of the gear the counterweight 158 is free to operate the shaft 154 to raise the pallet 159 into horizontal position as shown in dotted lines in Figure 16. This upward movement of the pallet plate swings the twisted and lower free end of the pretzel upwardly against the plate 111 while the latter is being retracted so that as soon as the folding operation is completed the pretzel is released and supported on the pallet 159. The counterweight 158 when freed to swing downwardly, is limited in its lowered position by a pin 164 on the counterweight and which engages the lower part of the housing 149. It will be noted from Figure 1 that the driving gear 148 on the shaft 135 has teeth which extend but half way around so that the other gear 148 remains at rest when the shaft or arm 154 projects inwardly beneath the former. As the gears 148 intermesh the arm 154 is swung forwardly about the shaft 146 as an axis and the pallet 159, through its lip 163 is swung to horizontal position to first fold the looped and twisted dough strip over upon itself into the form of a pretzel and subsequently the arm 154 is continued in its swinging motion until it reaches the outer side of the machine.

During this movement the folded pretzel is carried on the pallet 159 and the latter is maintained in horizontal position by means of the ratchet 155 and the dog 156. As the outer end of the arm 154 reaches the outer side of the machine the pinion 153 comes into contact with the opposite tooth section 151 of the stationary gear 150 with the result that the shaft 154 is rotated so as to turn the pallet 159 upwardly and over to deliver the pretzel to a desired point, such as upon an endless belt or conveyor 165. The endless conveyor 165 is horizontally disposed at the side of the machine and extends outwardly to a suitable oven and may deliver the pretzels in desired manner to an oven, and any suitable devices may be employed in conjunction with the conveyor 165 for effecting this result. A bar 166 is disposed lengthwise over the inner edge portion of the conveyor 165 and is supported upon brackets 167 or the like from the frame 30. This bar 166 is positioned to receive the laterally extending lug 162 of the pallet 159 so as to hold the pallet from contact with the conveyor. As soon as the pretzel is delivered upon the conveyor the pinion 153 passes beyond the toothed portion 151 of the stationary gear 150, and the shaft 154 is maintained in this position for substantially another half turn when the pinion 153 engages the gear teeth 152 and the operation is repeated.

Disposed preferably in the lower part of the frame 30 is a motor 168 which is connected by worm gearing 169 to a transverse shaft 170 mounted in the frame and provided toward one side with a clutch 171 which couples a shaft 172 to the shaft 170 and the shaft 172 carries a sprocket wheel 173 over which passes a chain 174 which also engages a second sprocket 175 on the shaft 135 to drive the same, the chain 174 extending upwardly and passing over a third sprocket wheel 176 on the conveyor shaft 177 which drives the conveyor 165 leading to the oven. The upper end of the chain 174 passes over a fourth sprocket 178 on a shaft 179, the latter having a sprocket wheel 180 over which the chain 56 passes for driving the strip rolling mechanism. The shaft 179 is provided with a cam 181 which extends about three-fourths way about the shaft and upon which bears a finger 182 pivoted to the frame and from which is pivotally suspended a bar 183 the lower end of which is provided with a presser foot 184 disposed adjacent the outer edge of the former 96 for pressing the upturned free ends of the folded pretzel to the loop thereof. The bar 183 is provided with a cam projection 185 adapted to slide over the face of a cam 186 fixed to the frame for imparting an inwardly swinging movement to the bar 183 as the latter is lowered when released by the cam 181.

From the above description it is apparent that a quantity of dough placed in the hopper 32 is fed by the worm 34 through the lower end of the cylinder 33 and is severed by the cutter 39 into desired lengths. During this operation the concave 40 is continuously rotated at the desired rate of speed so as to pick off by the plate 41 the severed portion of dough and to direct the same between the concave 40 and the stationary cylinder 47. The turning of the concave rolls the piece of dough into a strip of the desired size and length and after substantially a complete revolution the rolled or formed strip is deposited from the apron 46 onto the chute 71. The operation of the levers 75 and 84 through the cam block 87 distributes the formed strips one at a time downwardly in the chute and past the gate 88, and over the inclined plate 89 to the top of the conveyor 95. Through the operation of the reciprocating lever 102 the strip, which by this time has assumed a substantially inverted U-shape, is moved forwardly by the conveyor while the intermediate portions of the strip are held behind the laterally extending lugs 112 and the forward or closed portion of the strip is swung downwardly over the former head 96 and rests upon the bottom plate 111. The twisting mechanism as above described, is now raised by the pin 134 and brings the plates 114 and 126 into substantially closed position on the ends of the strip and holds the same in such position while the shaft 120 is rotated one complete turn to impart the twisting motion.

The twisting mechanism is now lowered out of the way and the pallet 159 is now brought into position beneath the former so as to engage the lower portion of the looped and twisted pretzel and swing the free ends and twisted portion thereof upwardly beneath the plate 111 and at this time the presser foot 184 is moved downwardly while the plate 111 is retracted. The retraction of the plate 111 releases the sides of the pretzel loop from the lugs 112 and the pretzel now rests wholly upon the pallet 159. As above described the pallet is carried forwardly and around to the side of the machine where it is operated to turn the pallet 159 over and deposit the pretzel upon the oven feeding belt 165.

It is apparent that the belt 165 may lead into one end of the oven or may be equipped with suitable devices for removing the pretzels from the belt and deliver them from the side onto the oven conveyor.

As shown to advantage in Figure 4, the belt 165 may be provided with a plurality of vanes or paddles 187 which are pivoted at their forward ends to the belt and adapted to turn over at the end of the belt for delivering the pretzels deposited on the vanes to an oven conveyor.

In order to maintain the twister in the proper position of rest beneath the former so that the arms 126 and the plates 114 will register with the suspended ends of the dough strip as it is delivered to the former, the frame of the machine is provided with an upstanding stop arm 187 which as shown in Figure 1 is adapted to engage the lower corner portion of one of the angle arms 124. As the initial operation of the twister is upward as to the arms 124, the latter escape the stop finger 187 so that the twister may rotate and by the time a full turn is consummated the arms 124 are released so as to drop back into normal position in the path of the finger 187, thus holding the twister in proper alinement for subsequent operation.

What is claimed is:—

1. In a pretzel making machine, a dough strip former, a single strip feeding means for receiving the strip of dough from the former and delivering the strip to the machine, suspension means for the strip for receiving the same from said feeding means and holding the strip with the free ends thereof in suspension, a stationary loop former adapted to receive the intermediate portion of a strip from the suspension means, a twisting device operable on the free ends of the strip on the suspension means for twisting the ends of the strip together, folding means for the twisted end of the strip adapted to raise the same against the formed loop of the strip, and means for pressing the free ends of the strip to the loop.

2. In a pretzel making machine including a dough rolling device for making dough strips; a former, means for delivering a strip to the former with the middle portions of the strip on the former and the ends hanging at the sides thereof, a twisting device adapted to engage and twist the free ends of the strip together, means for moving the looped portion of the strip over the former to provide a loop in the strip, and a combined folder and carrier operable upon the twisted end portion of each strip to fold the same against the loop of the strip and to subsequently carry the looped, twisted and folded strip from the machine.

3. In a pretzel making machine, including a dough strip former; feeding means arranged beneath the former for receiving a dough strip therefrom, a loop shaping device arranged beneath the feeder for receiving the strip therefrom and adapted to support the strip from the middle portion with the free ends in suspension, a twisting device disposed beneath the loop shaping means for engaging the free ends of the strip and twisting the same together, and a tilting support operable beneath the shaping means for engaging the twisted ends of the strip to fold the same against the formed loop and for subsequently discharging the strip from the machine.

4. In a pretzel making machine, including a dough strip roller for producing dough strips; a former, means for individually delivering a strip to the former with the ends of the strip hanging at the sides thereof, a combined end grasping and twisting device for engaging the free ends of the dough strip and twisting the same together, a swinging folder adapted to move beneath the former and engage the twisted ends of the strip, means for raising the folding device to close the free ends of the strip against the loops thereof, means for shifting the folding device from beneath the former, and means for operating the shifting device to discharge the strip therefrom.

5. In a pretzel making machine, a former, means for delivering a dough strip to the former with the ends of the strip hanging at the sides thereof, a loop shaping device cooperating with the former for swinging the closed intermediate portion of the strip into horizontal position to provide a horizontal loop, twisting means engaging the free ends of the strip for twisting the same together, a movable pallet disposed beneath the former, means for moving said pallet to engage the twisted ends of the strip and fold the same against the horizontal loop, means for carrying the pallet from beneath the former with the looped and folded strip thereon, and means for turning the pallet to discharge the strip therefrom.

6. In a pretzel making machine including a dough strip producing means, a former having a loop shaped head, means for delivering the dough strip to the former with the ends of the strip hanging at opposite sides thereof, a pusher cooperating with the former for engaging the intermediate portion of the strip to carry the same downwardly into horizontal position over the loop shaping device, a pallet, means for moving the pallet beneath the strip former, means for swinging the pallet upwardly against said loop shaping device to fold the strip together, means for carrying the pallet from beneath the former with the strip thereon, and means for turning the pallet to discharge the strip.

7. In a pretzel making machine, including a dough strip roller; a feed device disposed beneath said roller to receive a dough strip therefrom, a former disposed beneath said feeding device for engaging the intermediate portion of the dough strip and support the same with the ends suspended at the sides of the former, said former having a loop shaping head arranged horizontally at the outer end thereof, a twisting device disposed beneath the former for engaging the free ends of the suspended strip to twist said ends together, an arm pivotally mounted at one side of the machine, a pallet mounted on the outer end of the arm adapted to be swung into position beneath the former, means for turning the pallet with the arm into horizontal position for folding the twisted ends of the strip upwardly against the loop shaper, means for advancing the closed portion of the strip loop from the former to the shaper head, means for pressing the twisted ends of the strip against the loop thereof, holding means supporting the pallet in horizontal position to support the folded strip, means for swinging said arm to carry the pallet from beneath the former, and means for subsequently overturning the pallet to discharge the folded strip.

8. In a pretzel making machine, a dough strip former having a horizontal loop shaped head, means for delivering a strip of dough to the former with the free ends of the strip suspended at opposite sides thereof, means for moving the closed portion of the strip over said shaping head to provide a loop in the strip, twisting means arranged beneath the former to engage the free ends of the strip and twist the same together, a vertical shaft disposed at one side of the former, a radial arm mounted on the shaft to turn therewith, a pallet mounted on the outer end of the arm, means for turning the shaft to swing the pallet beneath said former, means for swinging the pallet into horizontal position against the twisted ends of the strip to fold the same against the loop of the strip, means for holding said pallet in horizontal position during the swinging of said arm outwardly from beneath the former, and means cooperating with the arm and the shaft for overturning the pallet to discharge the folded strip.

HARRY A. GERLAND.